United States Patent
Westmeyer et al.

(10) Patent No.: US 12,435,222 B2
(45) Date of Patent: Oct. 7, 2025

(54) WATER RESISTANCE FOR ORGANIC FACADES

(71) Applicant: Rohm and Haas Company, Philadelphia, PA (US)

(72) Inventors: Mark D. Westmeyer, Collegeville, PA (US); Charles J. Rand, Collegeville, PA (US); C. Damien Rodowski, Downingtown, PA (US); Jeffrey J. Sobczak, Coatesville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 704 days.

(21) Appl. No.: 17/440,439

(22) PCT Filed: Mar. 16, 2020

(86) PCT No.: PCT/US2020/022947
§ 371 (c)(1),
(2) Date: Sep. 17, 2021

(87) PCT Pub. No.: WO2020/197825
PCT Pub. Date: Oct. 1, 2020

(65) Prior Publication Data
US 2022/0154010 A1   May 19, 2022

Related U.S. Application Data

(60) Provisional application No. 62/822,270, filed on Mar. 22, 2019.

(51) Int. Cl.
| | | |
|---|---|---|
| C09D 5/02 | (2006.01) | |
| C09D 7/61 | (2018.01) | |
| C09D 7/63 | (2018.01) | |
| C09D 133/04 | (2006.01) | |
| C08K 3/22 | (2006.01) | |
| C08K 3/26 | (2006.01) | |
| C08K 3/36 | (2006.01) | |
| C08K 5/5317 | (2006.01) | |

(52) U.S. Cl.
CPC .......... *C09D 5/022* (2013.01); *C09D 5/028* (2013.01); *C09D 7/61* (2018.01); *C09D 7/63* (2018.01); *C09D 133/04* (2013.01); C08K 2003/2241 (2013.01); C08K 2003/265 (2013.01); C08K 3/36 (2013.01); C08K 5/5317 (2013.01)

(58) Field of Classification Search
CPC .......... C09D 5/022; C09D 5/028; C09D 7/61; C09D 7/63; C09D 133/04; C08K 3/36; C08K 5/5317; C08K 2003/2241; C08K 2003/265
See application file for complete search history.

(56) References Cited

U.S. PATENT DOCUMENTS

| | | | | |
|---|---|---|---|---|
| 3,345,432 | A | * 10/1967 | Gillham | C08K 5/5313 524/130 |
| 5,322,870 | A | * 6/1994 | Lin | C08K 5/5333 524/145 |
| 5,837,049 | A | 11/1998 | Watson et al. | |
| 6,403,826 | B1 | 6/2002 | Braig et al. | |
| 9,139,715 | B2 | 9/2015 | Sundararaman et al. | |
| 9,481,807 | B2 | 11/2016 | Sobczak et al. | |
| 10,106,744 | B2 | 10/2018 | Schneider et al. | |
| 2005/0064249 | A1 | 3/2005 | Apitz et al. | |
| 2007/0244230 | A1* | 10/2007 | Sixt | C08L 83/04 528/31 |
| 2009/0061246 | A1* | 3/2009 | Maltby | B01J 37/0219 427/407.1 |
| 2011/0136936 | A1* | 6/2011 | Hermes | C09D 5/02 523/172 |
| 2012/0017801 | A1* | 1/2012 | Rule | C04B 41/46 427/372.2 |
| 2012/0148826 | A1* | 6/2012 | Kratschmer | C04B 40/0042 106/809 |
| 2015/0083397 | A1* | 3/2015 | Monroe | C09K 8/528 166/244.1 |

(Continued)

FOREIGN PATENT DOCUMENTS

| | | |
|---|---|---|
| CN | 101309979 A | 11/2008 |
| EP | 0688816 | 12/1995 |

OTHER PUBLICATIONS

International Preliminary Report on Patentability for related PCT Application PCT/US2020/022947, mailed Oct. 7, 2021 (8 pgs).

(Continued)

*Primary Examiner* — Doris L Lee

(57) ABSTRACT

The present disclosure provides for a coating formulation that includes a pigment, an organic aqueous emulsion and an organophosphonic acid of the formula: where R is a saturated or unsaturated alkyl having 2 to 10 carbon atoms or a substituted or unsubstituted aryl having 5 to 10 carbon atoms. The coating formulation can be used in forming a topcoat in an exterior insulation and finish system (EIFS). The present disclosure also provides for a method of forming a topcoat on a surface of the EIFS that helps to protect the underlayment of the EIFS against both weathering and moisture while helping to maintain color retention.

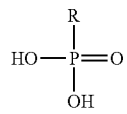

11 Claims, No Drawings

(56) References Cited

U.S. PATENT DOCUMENTS

2016/0083591 A1\* 3/2016 Connors, Jr. ........ C09D 125/14
                                                        523/122
2018/0162099 A1   6/2018 Furar et al.

OTHER PUBLICATIONS

International Search Report & Written Opinion for related PCT Application PCT/US2020/022947, mailed Jul. 1, 2020 (13 pgs).

\* cited by examiner

WATER RESISTANCE FOR ORGANIC FACADES

This application is a National Stage Application under 35 U.S.C. § 371 of International Application Number PCT/US2020/022947, filed Mar. 16, 2020 and published as WO 2020/197825 on Oct. 1, 2020, which claims the benefit to U.S. Provisional Application 62/822,270, filed Mar. 22, 2019, the entire contents of which are incorporated herein by reference in its entirety

FIELD OF DISCLOSURE

The present disclosure relates generally to coatings and more particularly to coatings for providing water resistance to organic facades.

BACKGROUND

Water resistance in organic facades is important to maintain the structural integrity of the building material. Typical organic facades such as "Exterior Insulation and Finish Systems (EIFS) and "External Thermal Insulation Composite Systems" (ETICS) are highly textured paint formulations. These paint formulations use polymeric binders that help to enhance the adhesive and reinforcing mortars used in the EIFS and ETICS.

One significant issue with EIFS and ETICS is the ability to minimize moisture infiltration. Moisture can cause structural damage to the underlaying structure along with reducing the thermal insulating capacity of the building material. Excess moisture can also lead to propagation of algae, salt efflorescence and damage to the mortar associated with freeze-thaw cycles. So, among the most important jobs of the exterior façade is to protect the underlayment against both weathering and moisture. Hydrophobic materials such as silicones have been used to impart water resistance in exterior coatings. The challenge with silicone materials are they afford initial water resistance, but they have a negative impact on color retention of the coating.

So, a new approach is needed to afford both improved water resistance and color retention in organic facades.

SUMMARY

The present disclosure provides for a coating formulation for a topcoat in an exterior insulation and finish system (EIFS) that helps to protect the underlayment of the EIFS against both weathering and moisture while helping to maintain color retention. The coating formulation of the present disclosure includes a pigment, an organic aqueous emulsion and an organophosphonic acid of the formula:

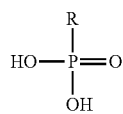

where R is a saturated or unsaturated alkyl having 2 to 10 carbon atoms or a substituted or unsubstituted aryl having 5 to 10 carbon atoms. For the various embodiments, R of the organophosphonic acid is phenyl. In additional embodiments, R is an unsaturated alkyl having 2 carbon atoms to provide ethenylphosphonic acid.

The pigment is present in an amount to provide the coating formulation with a total pigment volume concentration (PVC) content of 70 to 90 percent. Preferably, the pigment is present in an amount to provide the coating formulation with a total PVC content of 75 to 85 percent. In one embodiment, the pigment is titanium dioxide.

For the various embodiments, the organic aqueous emulsion is selected from the group consisting of an acrylic aqueous emulsion, a polyurethane dispersion, a polyolefin dispersion and combinations thereof. Preferably, the organic aqueous emulsion is an acrylic aqueous emulsion. For the various embodiments, the acrylic aqueous emulsion is formed with a polymer resin selected from the group consisting of an acrylic resin, a styrene-acrylic resin and combinations thereof. For the embodiments, polymer resin (e.g., either the acrylic resin or the styrene-acrylic resin) is formed with a monomer selected from the group consisting of acrylic acid, methacrylic acid, methyl methacrylate, acrylonitrile, ethyl acrylate, butyl acrylate, 2-ethylhexyl acrylate, styrene and combinations thereof.

The coating formulation of the present disclosure can include 4 to 10 weight percent (wt. %) of the polymer resin from the organic aqueous emulsion. Preferably, the coating formulation can include 5 to 8 wt. % of the polymer resin from the organic aqueous emulsion. Most preferably, the coating formulation can include 6 to 7 wt. % of the polymer resin from the organic aqueous emulsion. The wt. % of the polymer resin is the dry weight of the organic aqueous emulsion based on the total solids weight of the coating formulation. Preferably, organic aqueous emulsion is the acrylic aqueous emulsion acrylic, where the wt. % of the acrylic is the dry weight of the acrylic aqueous emulsion based on the total solids weight of the coating formulation.

The coating formulation of the present disclosure can include 0.5 to 5 wt. % of the organophosphonic acid. Preferably, the coating formulation can include 0.7 to 1.5 wt. % of the organophosphonic acid based on the total solids weight of the coating formulation. The wt. % of the organophosphonic acid is based on the total solids weight of the coating formulation. For the various embodiments, the organophosphonic acid is selected from the group consisting of 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid and combinations thereof.

The coating formulation of the present disclosure can also further include a filler selected from the group consisting of silicon dioxide, sand, aggregate and combinations thereof. The coating formulation of the present disclosure can also further include an extender selected from the group consisting of clay, calcium carbonate, silicates, alumina silicates, talc, dolomite, silicate minerals and combinations thereof.

The coating formulation of the present disclosure can be used in forming a topcoat in an exterior insulation and finish system (EIFS). The method of forming the topcoat on a surface of the EIFS includes applying the coating formulation of the present disclosure on the surface of the EIFS and allowing the coating formulation to dry on the surface of the EIFS to form a topcoat on the surface of the EIFS. As discuss herein, the topcoat on the surface of the EIFS can help to protect the underlayment of the EIFS against both weathering and moisture while helping to maintain color retention.

DETAILED DESCRIPTION

The present disclosure provides for a coating formulation for a topcoat in an exterior insulation and finish system (EIFS) that helps to protect the underlayment of the EIFS against both weathering and moisture while helping to maintain color retention.

In the present disclosure, references to percent or percent weight are based on dry weight of the composition, unless otherwise specified. Unless otherwise indicated, all temperature and pressure units are room temperature (23° C.) and standard pressure (101.3 kPa, STP). All ranges recited in the disclosure are inclusive and combinable. All phrases comprising parentheses denote either or both of the included parenthetical matter and its absence. For example, the phrase "(meth)acrylate" includes, in the alternative, acrylate and methacrylate.

Exterior Insulation and Finish Systems (EIFS) as used herein are a general class of non-load bearing building cladding systems that provides exterior walls with an insulated, water-resistant, finished surface in an integrated composite material system. Systems like EIFS include those known as an external wall insulation system and an external thermal insulation cladding system (ETICS). The use of EIFS and ETICS can be used interchangeably herein. As is known in the art, the two classes of EIFS are Class PB (polymer based, identified as PB EIFS) and Class PM (polymer modified, identified as PM EIFS). PB EIFS have an insulation board (e.g., expanded polystyrene (EPS) or polyisocyanurate) adhered to the substrate with a mesh (e.g., fiberglass mesh) embedded in a nominal base coat. PM EIFS has an extruded polystyrene insulation (REPS) and a thick, cementitious base coat applied over mechanically attached reinforcing mesh. The coating formulation of the present disclosure can be used to form the base coat or as a top coat or finish coat of the EIFS.

The pigment volume concentration (PVC) is the amount of a particular pigment that can be properly wetted once added to a coating formulation. The pigment in the coating formulation needs enough "wetting" by the polymer to create a protective coating. The point at which there is just enough polymer to wet the pigment particles is known as the critical pigment volume concentration (CPVC). Below the CPVC there is enough polymer for pigment wetting and above the CPVC there is not. There are abrupt changes in the coating properties at the CPVC. Calculate the PVC using the following equation:

% PVC=100*$V_{pigment}/(V_{pigment}+V_{binder})$ $V_{pigment}$=Pigment volume
$V_{binder}$=Acrylic binder present in the Acrylic Aqueous Emulsion volume Reference: W. K. Asbeck; Maurice Van Loo *Ind. Eng. Chem.* 1949, 41 (7), 1470-1475. Sarah Sands *Golden Artist Colors* 2016, 34, 1, which is incorporated herein by reference in its entirety.

Delta E (Δ E) is a metric for understanding how the human eye perceives color difference. ΔE is a single number that represents the 'distance' between two colors. On a typical scale, the ΔE value will range from 0 to 100. A ΔE of 1.0 is the smallest color difference the human eye can see. Any ΔE less than 1.0 is imperceptible and it stands to reason that any ΔE greater than 1.0 is noticeable.

ΔE* (Total Color Difference) is calculated based on a L*, a*, b* color differences and represents the distance of a line between the sample and standard. The International Commission on Illumination (CIE) CIE76 formula was used to calculate all values:

$$\Delta E^* = \sqrt{(L^*_2-L^*_1)^2+(a^*_2-a^*_1)^2+(b^*_2-B^*_1)^2}$$

Where the above formula is found in any of the following: Hunter Lab (https://www.hunterlab.com); Digital Color Imaging Handbook (1.7.2 ed.) Sharma, Gaurav (2003) CRC Press (ISBN 0-8493-0900-X), which are incorporated herein by reference in their entirety.

As used herein the term "acrylic" refers to polymers that comprise the polymerization product of monomer mixtures containing more than 50 wt. %, based on total monomer solids, of any acrylic monomers such as, for example, acrylates, methacrylates, (meth)acrylamides, and (meth)acrylic acids. Other acrylic monomers as also possible and provided herein.

The coating formulation of the present disclosure includes a pigment, an organic aqueous emulsion and an organophosphonic acid of the formula:

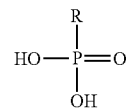

where R is a saturated or unsaturated alkyl having 2 to 10 carbon atoms or a substituted or unsubstituted aryl having 5 to 10 carbon atoms.

The pigment is present in an amount to provide the coating formulation with a total pigment volume concentration (PVC) content of 70 to 90 percent. Preferably, the pigment is present in an amount to provide the coating formulation with a total PVC content of 75 to 85 percent. For the avoidance of doubt, PVC is calculated using the formula recited below, where $V_{pigment}$ represents the volume of pigment within the coating formulation, and $V_{binder}$ represents the volume of polymeric binder within the composition PVC (%)=$V_{pigment}/(V_{pigment}+V_{binder})\times 100$ Preferably, the exterior coating formulation comprises from 10 to 30 wt. %, based on the total weight of the exterior coating formulation, of water. Preferably, the exterior coating formulation is a topcoat in an exterior insulation and finish system (EIFS).

The pigment may be an inorganic pigment, e.g., a titanium, aluminum, cobalt, copper, iron, chromium, lead, manganese, titanium or tin pigment, or the pigment may be an organic pigment, e.g., carbon black. Preferably, the pigment is an inorganic pigment, more preferably a titanium pigment and most preferably titanium dioxide ($TiO_2$). When present as a dry mix formulation preferably comprises such pigment(s) in an amount no more than 10 wt. %, preferably from 1 to 10 wt. %, based on the total weight of the dry mix formulation.

For the various embodiments, the organic aqueous emulsion is selected from the group consisting of an acrylic aqueous emulsion, a polyurethane dispersion, a polyolefin dispersion and combinations thereof. The coating formulation of the present disclosure can include 4 to 10 weight percent (wt. %) of the polymer resin from the organic aqueous emulsion. Preferably, the coating formulation can include 5 to 8 wt. % of the polymer resin from the organic aqueous emulsion. Most preferably, the coating formulation can include 6 to 7 wt. % of the polymer resin from the organic aqueous emulsion. The wt. % of the polymer resin is the dry weight of the organic aqueous emulsion based on the total solids weight of the coating formulation.

For the various embodiments, the organic aqueous emulsion is preferably an acrylic aqueous emulsion. The acrylic aqueous emulsion of the various embodiments is formed with a polymer resin selected from the group consisting of an acrylic resin, a styrene-acrylic resin and combinations thereof. The coating formulation of the present disclosure can include 4 to 10 weight percent (wt. %) of the polymer resin from the acrylic aqueous emulsion. Preferably, the coating formulation can include 5 to 8 wt. % of the polymer resin from the acrylic aqueous emulsion. Most preferably, the coating formulation can include 6 to 7 wt. % of the polymer resin from the acrylic aqueous emulsion. The wt. % of the polymer resin is the dry weight of the polymer resin from the acrylic aqueous emulsion based on the total solids weight of the coating formulation.

For the embodiments, the polymer resin (e.g., either the acrylic resin or the styrene-acrylic resin) of the acrylic aqueous emulsion is formed with a monomer selected from the group consisting of acrylic acid, methacrylic acid, methyl methacrylate, acrylonitrile, ethyl acrylate, butyl acrylate, 2-ethylhexyl acrylate, styrene and combinations thereof. Other ethylenically unsaturated monomers may be copolymerized with the acrylic resin or the styrene-acrylic resin. The composition of the resultant resin copolymer is largely dependent upon the application. Examples of these other monomers for forming the acrylic resin or the styrene-acrylic resin can include acrylamide, t-amyl methacrylate, n-decyl methacrylate, n-dodecyl acrylate, n-hexyl acrylate, n-octyl methacrylate and combinations thereof. Preferably, the polymer resin is formed with monomers selected from the group consisting of butyl acrylate, methyl acrylic acid and methyl methacrylate. In an additional embodiment, the polymer resin is formed from acrylic acid, butyl acrylate, methyl methacrylate and styrene.

The polymer resin used in the acrylic aqueous emulsion has a Tg of 0 to 35° C. measured according to ASTM D6604-00 (2017). Preferably, the polymer resin used in the acrylic aqueous emulsion has a Tg of 10 to 30° C. measured according to ASTM D6604-00 (2017). The Tg of the polymer resin can be calculated by using the Fox Equation (T. G. Fox, Bull. Am. Physics Soc., Volume 1, Issue No. 3, page 123 (1956)), where calculating the $T_{g,mix}$ of a copolymer of monomers $M_1$ through $M_i$ is determined using the equation:

$$1/T_{g,mix} \approx \Sigma_i \omega_i/T_{g,i}$$

wherein $T_{g,mix}$ is the glass transition temperature calculated for the copolymer; $w_i$ is the weight fraction of monomer $M_i$ in the copolymer; $Tg_i$ is the glass transition temperature of the homopolymer of $M_i$, all temperatures being in degree Kelvin. The glass transition temperature of homopolymers may be found, for example, in "Polymer Handbook", edited by J. Brandrup and E. H. Immergut, Interscience Publishers. In calculating Tgs herein the contribution of copolymerized graftlinking monomers is excluded. The calculated Tg is calculated from the total overall composition of the polymer resin.

The polymer resin used in the acrylic aqueous emulsion can have a weight average molecular weight of 50,000 to 1,000,000. Techniques for measuring the weight average molecular weight include, but are not limited to, static light scattering or gel permeation chromatography (GPC) using polystyrene standards, as are known in the art.

The polymerization techniques used to prepare the acrylic aqueous emulsion are well known in the art (e.g., examples disclosed in U.S. Pat. Nos. 4,325,856; 4,654,397; and 4,814,373 among others). As noted herein, the polymer resin of the acrylic aqueous emulsion can be prepared as an acrylic polymer waterborne emulsion formed using emulsion polymerization techniques. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used can be from 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. The monomer mixture for a stage may be added neat or as an emulsion in water. The monomer mixture for a stage may be added in a single addition or more additions or continuously over the reaction period allotted for that stage using a uniform or varying composition; preferred is the addition of the polymer monomer(s) emulsion as a single addition. Additional ingredients such as, for example, free radical initiators, oxidants, reducing agents, chain transfer agents, chelating agents, stabilizing agents, neutralizers, surfactants, and dispersants may be added prior to, during, or subsequent to any of the stages.

Exemplary acrylic aqueous emulsions include those provided under the trade designator UCAR™ from The Dow Chemical Company (Midland, MI), PRIMAL™ brand emulsions available from The Dow Chemical Company, RHOPLEX™ brand acrylic emulsions available from The Dow Chemical Company, and HYDRHOLAC™ brand aqueous dispersion polymers available from The Dow Chemical Company. Water may account for 10 wt. % to 99 wt. % of a total weight of the aqueous composition.

Examples of the polyurethane dispersion (PU dispersion) useful in the present disclosure include those prepared by reacting polyols with polyisocyanates through the processes and under conditions well known in the art. Commercially available PU dispersions may also be used in the present disclosure. Examples of commercially available PU dispersions include PRIMAL™ U-91 available from the Dow Chemical Company, BAYHYDROL™ UH 240, BAYHYDROL™ UH XP 2648 and IMPRANIL™ DL 1537 available from Bayer Material Science AG. Examples of the polyolefin dispersion (PO dispersion) useful in the present disclosure include, for example, propylene- and ethylene-based dispersions as are known in the art. Examples of the PO dispersion useful in the present disclosure also include those based on olefin block copolymers. Examples of the PO dispersions useful in the present disclosure include those commercially available under the tradename HYPDOD™ and CANVERA™, both available from The Dow Chemical Company.

For the organophosphonic acid, the organo group may be a monomeric, oligomeric or polymeric group. The organophosphonic acid of the present disclosure preferably has the formula:

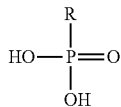

where R is a saturated or unsaturated alkyl having 2 to 10 carbon atoms or a substituted or unsubstituted aryl having 5 to 10 carbon atoms. Preferably, R of the organophosphonic acid is phenyl. In an additional preferably embodiment, R is an unsaturated alkyl having 2 carbon atoms to provide ethenylphosphonic acid. Examples of organo groups which may comprise R include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, fluoro such as $CF_3(C_nF_{2n})CH_2CH_2PO_3H_2$ where n=3 to 15, $CF_3(CF_2)_xO(CF_2CF_2)_y$—$CH_2CH_2$—$PO_3H_2$ where x is 0 to 7, y is 1 to 20 and x+y≤27, phosphonate, phosphinate, sulfonate, carbonate and mixed substituents.

The coating formulation of the present disclosure can include 0.5 to 5 wt. % of the organophosphonic acid. Preferably, the coating formulation can include 0.7 to 1.5 wt. % of the organophosphonic acid based on the total solids weight of the coating formulation. The wt. % of the organophosphonic acid is based on the total solids weight of the coating formulation.

For the various embodiments, representative organophosphonic acid are selected from the group consisting of 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid and combinations thereof. Other organophosphonic acids included amino trismethylenephosphonic acid, aminobenzylphosphonic acid, 3-amino propyl phosphonic acid, O-aminophenyl phosphonic acid, 4-methoxyphenyl phosphonic acid, aminophenylphosphonic acid, aminopropylphosphonic acid, benzhydrylphosphonic acid, bis-(perfluoroheptyl) phosphonic acid and perfluorohexyl phosphonic acid. In addition to the monomeric organophosphonic acids, oligomeric or polymeric organophosphonic acids resulting from self-condensation of the respective monomeric acids may be used.

The organophosphonic acid can be dissolved or dispersed in a diluent. Suitable diluents include alcohols such as methanol, ethanol or propanol; aliphatic hydrocarbons such as hexane, isooctane and decane, ethers, for example, tetrahydrofuran and dialkylethers such as diethylether. Also, aqueous alkaline solutions such as sodium and potassium hydroxide can be used as the diluent.

In addition, the coating formulation of the present disclosure can further include other conventional additives such as, for example, an antifoaming agent, which is typically present in an amount of up to 1.5 wt. %, based on total solids. Other additives that may be employed, in conventional amounts, include one or more salts, such as $CaCl_2$), $MgCl_2$, monosaccharides, disaccharides, dispersants or superplasticizers.

The coating formulation of the present disclosure can further include a filler and/or extender particles. Such filler or extender particles are included to provide opacity to the coating formulation. If present, the filler or extender particles are preferably included in an amount of from 2 to 30 wt. %, more preferably from 4 to 25 wt. %, even more preferably from 10 to 15 wt. %, based on the dry weight of the coating formulation.

For the various embodiments, the filler is selected from the group consisting of silicon dioxide, sand, aggregate and combinations thereof. The coating formulation of the present disclosure can also further include an extender selected from the group consisting of clay, calcium carbonate, silicates, alumina silicates, talc, dolomite, silicate minerals and combinations thereof. Most preferably, the filler or extender particles are selected from calcium carbonate, silicates and combinations thereof.

The coating formulation of the present disclosure can be used in forming a topcoat in an exterior insulation and finish system (EIFS), as provided herein. As appreciated by one skilled in the art, the most exterior layer of an EIFS is called the topcoat. Other layers of the EIFS include an inner layer of foam plastic insulation (e.g., polystyrene boardstock) and an intermediate adhesive filler layer applied on the outer face of the foam plastic insulation. The adhesive filler layer substantially surrounds and fills a reinforcing mesh, which is embedded in the adhesive filler layer.

The topcoat is normally a colored (e.g., includes a pigment) and textured paint-like material that is applied with a trowel or by spraying. A wide range of colors and textures are available for the topcoat. Examples of textures include smooth surfaces, rough stucco-like textures, embedded stone chips, granite-like mixtures and brick-like treatments, among others.

Embodiments of the present disclosure include a method of forming the topcoat on a surface of the EIFS. The method includes applying the coating formulation as discussed herein on the surface of the EIFS and allowing the coating formulation to dry on the surface of the EIFS to form a topcoat on the surface of the EIFS. Application and drying of the coating formulation of the present disclosure to form the topcoat can take place at an ambient temperature of 5° C. to 30° C. and a relative humidity of less than 85%. As discuss herein, the topcoat on the surface of the EIFS can help to protect the intermediate and inner layers of the EIFS against both weathering and moisture while helping to maintain color retention.

EXAMPLES

Obtain all data by evaluating an organic binder with selected materials (e.g., organophosphonic acids, silicones) in either an Exterior Insulation and Finish Systems (EIFS) or an "External Thermal Insulation Composite Systems" (ETICS) formulation. Both formulations are summarized in Table 1. All raw materials listed in Table 1 were obtained as commercial samples or purchased and evaluated as received.

EIFS Formulations

Use multiple EIFS formulations to evaluate the impact of the organophosphonic acids on both water absorption and color retention. EIFS Formulation 1 and EIFS Formulation 2 (Table 1) are latex formulations found in current technical datasheets for Rhoplex™ EI-2000 (The Dow Chemical Company, North America) and UCAR™ 424 (The Dow Chemical Company, Europe), respectively. The primary differences between EIFS Formulation 1 and EIFS Formulation 2 are the extenders and the pigment volume concentration (PVC). EIFS Formulation 1 has a PVC of 78.8 and uses Minex™ (nephylene synite, $Al_xSi_yO_z$) as an extender. EIFS Formulation 2 has a PVC of 82.7 and uses calcium carbonate as an extender. Use Rhoplex™ EI-2000 (The Dow Chemical Company), and UCAR™ 424 (The Dow Chemical Company, Europe) as the EIFS controls for all testing. Use these materials as received. The examples herein also use "Dispersion 1" where the procedure to prepare Dispersion 1 is seen below. Table 1 provides a summary of each EIFS Formulation.

TABLE 1

Summary of EIFS Formulations

| Ingredient | Function | EIFS Formulation 1 Grams (g) | % wt. | EIFS Formulation 2 g | % wt. |
|---|---|---|---|---|---|
| Rhoplex ™ EI-2000 (46.5%) | Binders | 287.79 | 18.035% | | |
| UCAR ™ DL424 (49.5%) | | | | 218.60 | 13.84% |
| Ethylene Glycol | Solvents | 5.00 | 0.313% | | |
| Methocel ™ J75MS | Thickeners. Nonionic | | | 1.60 | 0.10% |
| Nopco ™NXZ | Defoamers | 2.00 | 0.125% | 1.60 | 0.10% |
| Calgon ™ N (10%) | Dispersants | | | 16.00 | 1.01% |
| Tamol ™ 165A (21%) | Dispersants.Hydrophobic Copolymer | | | 3.00 | 0.19% |
| Ti-Pure ™ R-746 | Pigments, Titanium Dioxide | 64.88 | 4.065% | 136.80 | 8.66% |
| Temisca ™#15 sand | | 142.26 | 8.915% | 191.50 | 12.12% |
| Unimin ™ 50-30 sand | Pigments, Functional | 850.00 | 53.266% | 780.30 | 49.39% |
| Attagel ™ 50 | | 10.00 | 0.627% | | |
| Minex ™ 4 | Pigments, Extender | 137.03 | 8.587% | | |
| Durcal ™ 2 | $CaCO_3$ Extender | | | 95.70 | 6.06% |
| Durcal ™ 40 | | | | 79.80 | 5.05% |
| Rozone ™ 2000 | Preservatives | 2.00 | 0.125% | 1.60 | 0.10% |
| Texanol Ester Alcohol | Coalescents | 3.97 | 0.249% | | |
| Dowanol ™ DPnB | | | | 6.40 | 0.41% |
| Ammonia (28%) | Neutralizing Agents | 2.50 | 0.157% | 3.20 | 0.20% |
| Sodium Hydroxide (10%) | | | | | |
| Acrysol ™ ASE-60 | Thickeners. Ionic | 7.50 | 0.470% | | |
| Water | Water | 80.84 | 5.066% | 43.70 | 2.77% |
| Totals | | 1595.77 | 100 | 1579.80 | 100 |

| Property | | Value | Value |
|---|---|---|---|
| Total Volume | gal | 100.2 | 92.6 |
| Total Weight | lb | 1595.8 | 1579.8 |
| Total PVC | % | 78.8 | 82.7 |
| Volume Solids | % | 67.32 | 71.54 |
| Weight Solids | % | 82.89 | 86.03 |
| Density | lb/gal | 15.923 | 17.058 |
| Dry Density | lb/gal | 19.530 | 20.445 |
| Total Coalescent | % | 2.97 | 5.97 |
| Total Dispersant | % | 0.00 | 0.18 |
| VOC Generic Water Exc | g/L | 18.2 | 13.5 |
| fCPVC | % | 101.2 | 107.9 |
| % Organic Polymer | % | 8.39% | 6.85% |

TABLE 2

Materials Used in Examples

| Chemical | Description | Source |
|---|---|---|
| Rhoplex ™ EI-2000 Emulsion | Acrylic Aqueous Emulsion (46.5% Active) | The Dow Chemical Company (US only) (https://www.dow.com/en-us/product-search/) |
| UCAR ™ DL 424 Emulsion | Styrene-Acrylic Aqueous Emulsion (49.5% Active) | The Dow Chemical Company (Europe only) (https://www.dow.com/en-us/product-search/) |

TABLE 2-continued

Materials Used in Examples

| Chemical | Description | Source |
|---|---|---|
| Phenylphosphinic Acid | Catalog# P28808<br>CAS Number 1779-48-2 | Sigma-Aldrich Chemical Company (https://www.sigmaaldrich.com/) |
| Vinylphosphonic Acid | Catalog# 396311<br>CAS Number 1746-03-8 | Sigma-Aldrich Chemical Company (iittps://www.sigmaaldrich.com/) |
| n-Octylphosphonic Acid | Catalog# 735914<br>CAS Number: 4724-48-5 | Sigma-Aldrich Chemical Company (https://www.sigmaaldrich.com/) |
| DOWSIL ™ IE-6683 Water Repellent | Emulsion blend of Silane and Siloxane (40% Active) | Dow Corning Corporation (https://consumer.dow.com/en-us.html) |
| XIAMETER ® RSN-5314 Resin | Liquid phenyl, phenylmethyl methoxy functional intermediate | Dow Corning Corporation (https://consumer.dow.com/en-us.html) |
| XIAMETER ™ OFS-6595 Silane | n-Octyltriethoxysilane | Dow Corning Corporation (https://consumer.dow.com/en-us.html) |
| DOWSIL ™ IE-2404 Emulsion | Silicone resin emulsion for coating applications (50% Active) | Dow Corning Corporation (https://consumer.dow.com/en-us.html) |
| TEGO ®Phobe 1650 | silicone resin emulsion for the hydrophobation of facade coatings (50% Active) | Evonik Industries AG (https://corporate.evonik.com/en/) |
| Dow Corning ™ Q1-3563 | OH end-blocked polydimethylsiloxane | Dow Corning Corporation (https://consumer.dow.com/en-us.html) |
| Ethylene Glycol | Ethylene Glycol<br>CAS# 107-21-1<br>Catalog# E178-500 | Fisher Scientific (https://www.fishersci.com/us/) |
| Methocel ™ J75MS | Hydroxypropyl Methylcellulose (HPMC) thickener<br>Viscosity range 60,000 to 75,000 cPs | Chempoint (https://www.chempoint.com/) |
| Nopco ™ NXZ defoamer | CAS# 12794-56-8 (or FOAMASTER NXZ) | BASF (https://worldaccount.basf.com/) |
| Calgon ™ N (10%) | medium chain sodium polyphosphate<br>CAS#: 68915-31-1 | ICL Advanced Additives |
| Tamol ™ 165A | Ammonium salt of a hydrophobic copolymer dispersant (21% Active) | The Dow Chemical Company (https://www.dow.com/en-us/product-search/) |
| Ti-Pure ™ R-746 | A multipurpose rutile titanium dioxide slurry of Ti-Pure ® R-706 (76% Active) | The Chemours Company (https://www.chemours.com/) |
| Temisca ™ #15 sand | Silica Sand | Opta Minerals Inc. |
| Unimin ™ 50-30 sand | Silica Sand (MicroTalc ® MP 50-30) | The Cary Company (https://www.thecarycompany.com/) |
| Attagel ® 50 | Attapulgite, highly pulverized powder<br>Median Particle Size 9 microns<br>CAS# 12174-11-7 | BASF (https://worldaccount.basf.com/) |
| Minex ® 4 | Nepheline Syenite<br>CAS#: 37244-96-5<br>Median Particle Size 7.6 microns | The Cary Company (https://www.thecarycompany.com/) |
| Durcal ™ 2 | Calcium Carbonate (or Omyacarb ® 2)<br>CAS#: 72608-12-9<br>Median Particle Size 2 microns | Omya (https://www.omya.com/) |
| Durcal ™ 40 | Calcium Carbonate (or Omyacarb ® 2)<br>CAS#: 72608-12-9<br>Median Particle Size 45 microns | Omya (https://www.omya.com/) |
| Rozone ™ 2000 | A preservative based on dichloro octylisothiazolinone (DCOIT) | Chempoint (https://www.chempoint.com/) |
| Texanol Ester Alcohol | 2,2,4-Trimethyl-1,3-pentanediol monoisobutyrate (CAS# 25265-77-4) | Sigma-Aldrich Chemical Company (https://www.sigmaaldrich.com/) |
| Dowanol ™ DPnB | Dipropylene glycol n-butyl ether (CAS# 29911-28-2) | The Dow Chemical Company (https://www.dow.com/en-us/product-search/) |
| Ammonia (28%) | Ammonium Hydroxide, ACD Reagent<br>Catalog# A669S-500<br>CAS# 1336-21-6 | Fisher Scientific (https://www.fishersci.com/us/) |
| Sodium Hydroxide (50%) | Sodium Hydroxide Solution (50% w/w)<br>Catalog# SS410-4<br>CAS# 1310-73-2 | Fisher Scientific (https://www.fishersci.com/us/) |

TABLE 2-continued

Materials Used in Examples

| Chemical | Description | Source |
| --- | --- | --- |
| Acrysol ™ ASE-60 | Alkali-Soluble Anionic Thickener (28% Active) | The Dow Chemical Company (https://www.dow.com/en-us/product-search/) |
| Phosphoric acid 2-hydroxyethyl methacrylate ester | Catalog# 695890 CAS Number 52628-03-2 | Sigma-Aldrich Chemical Company (https://www.sigmaaldrich.com/) |
| Rhodacal® DS-4 | Aqueous solution of sodium dodecyl (branched) benzene sulfonate (22.5% Actives) CAS# 25155-30-0 | Rhodia Solvay Group (https://www.solvay.com/) |
| Aerosol ™ 22 | Tetrasodium n-(1,2-Dicarboxyethyl)-n-Octadecyl Sulfosuccinamate CAS# 38916-42-6 Aqueous solution (35% actives) | Rhodia Solvay Group (https://www.solvay.com/) |
| Tamol ™ 850 | Acrylic Polyacid Dispersant Aqueous Solution (30% Actives) | The Dow Chemical Company (https://www.dow.com/en-us/product-search/) |
| Zoco ® 101 | Zinc Oxide CAS#: 1314-13-2 | Zochem LLC (https://www.zochem.com/) |
| Skane ™ M-8 Mildewcide | 2-n-octyl-4-isothiazolin-3-one, CAS# 2653902901 | The Dow Chemical Company (https://www.dow.com/en-us/product-search/) |
| Natrosol 250 MXR | Hydroxyethylcellulose is a nonionic water-soluble cellulose ether. | Ashland (https://www.ashland.com/) |
| SnowWhite ® 12 | Calcium Carbonate (or Omyacarb ® 2) CAS#: 72608-12-9 Median Particle Size 12 microns | Omya (https://www.omya.com/) |
| Ti-Pure ™ R-960 | A multipurpose rutile titanium dioxide | The Chemours Company (https://www.chemours.com/) |
| Rhoplex ™ EC-1791 | Acrylic Copolymer Dispersion (55% Solids) | The Dow Chemical Company (https://www.dow.com/en-us/product-search/) |

Procedure

Dispersion 1

To a 5 L glass reactor equipped with a mechanical stirrer (IKA Model RW20), thermocouple, condenser and a stainless-steel dip-tube add 660 grams (g) of deionized (DI) water at ambient temperature (21° C.) and warmed to 84° C. Prepare a monomer emulsion (ME) by mixing 435 g DI water, 50.0 g Rhodacal® DS-4, 1135.7 g n-Butyl Acrylate, 24.7 g Methacrylic Acid, 726.1 g Methyl Methacrylate and 11.2 g Phosphoric acid 2-Hydroxyethyl Methacrylate Ester. With the DI water in the reactor at 84° C., an aqueous solution composed of 4.25 g Rhodacal® DS-4 and 18 g DI water was added to the glass reactor. Add 75.7 g of the ME to the glass reactor followed by an aqueous solution of 4.7 g sodium persulfate and 53 g DI water. Reduce the temperature of the reactor to 76° C. The reaction is exothermic causing the temperature of the reactor content to reach 84° C. within 5 minutes. Next pump the ME with a FMI pump (Fluid Meter Incorporated, Syosset, NY) at 14 g/min into the reactor. Simultaneously, add aqueous solution A (composed of 2.82 g of sodium persulfate and 207 g DI water) and aqueous solution B (composed of 9.38 g ammonium hydroxide (30% Active) and 177 g DI water) at 1.24 g/min into the reactor using a syringe pump. Maintain the reactor temperature between 84-86° C. After 20 minutes, increase the feed rates of the ME and the aqueous solutions A and B to 28 and 2.48 g/min, respectively. After 90 min, both the ME and aqueous solutions A and B feeds were complete. Rinse the ME feed line with 43 g DI water. Cool the reactor to 75° C. Next, add three solutions to the reactor sequentially: 1) an aqueous solution composed of 0.0015 g ferrous sulfate heptahydrate, 0.010 g ethylenediaminediacetic acid tetrasodium salt hydrate and 9 g DI water, 2) 0.11 g isoascorbic acid and 9 g DI water and 3) 0.31 g of an aqueous solution of tert-butylhydroperoxide (t-BHP, 70%) and 9 g DI water. Add each solution sequentially to the reactor over about 30 seconds. Add two aqueous solutions to the reactor over 30 minutes. These aqueous solutions: Solution 1 is composed of 0.44 g isoascorbic acid and 22 g DI water and Solution 2 is composed of 1.20 g t-BHP and 22 g DI water. Cool the reactor from about 75 to 60° C. during these feeds. At 50° C., add 10.38 g of an ammonium hydroxide solution (30% active) to the reactor. Add 27.0 g of Aerosol 22 surfactant to the reactor. Feed a solution composed of 15.7 g sodium hydroxide solution (50% active) and 146 g DI water to the reactor over 30 minutes. The resulting Dispersion 1 was isolated and analyzed: 45.4% Solids; pH 10.0, 4 ppm MMA, and 219 ppm BA. Particle size of the dispersion was 169 nm using a Brookhaven Instruments 90 Plus Particle Size Analyzer.

Example (EX) and Comparative Example (CE) of Coating Formulation

Prepare each Example (EX) and Comparative Example (CE) of the coating formulation using a Hobart® Stand Mixer (Model N-50 Hobart Mixer, Troy, Ohio) by adding the materials in the order listed in Table 3 starting with the specified organic binder. Usage levels reported are versus the active polymer content and not the total formulation weight. Prepare each EX and CE at room temperature (23° C.). Use the low speed settings for the Hobart® mixer model, unless specified otherwise. Mix the completed EX or CE for 30 minutes. Equilibrate all coating formulations for 24 hours before use.

TABLE 3

| | Organic Binder | Additive | EIFS Formulation | 1 Day Ave | 1 Day Stdev | 2 Day Ave | 2 Day Stdev | 7 Day Ave | 7 Day Stdev |
|---|---|---|---|---|---|---|---|---|---|
| | | | Controls - Base Polymer without additives | | | | | | |
| CE A | EI-2000 | None | EIFS 1 | 6.32% | 0.19% | 5.72% | 0.16% | 5.66% | 0.23% |
| CE B | DL424 | None | EIFS 1 | 13.36% | 0.78% | 12.32% | 0.68% | 12.48% | 0.44% |
| | | | Comparative Examples - Silicone/Silanes | | | | | | |
| CE C | DL424 | 10% IE-6683 | EIFS 1 | 8.05% | 0.05% | 10.62% | 0.30% | 11.29% | 0.48% |
| CE D | DL424 | 10% RSN-5314 | EIFS 1 | 14.57% | 0.04% | 15.40% | 0.10% | 14.90% | 0.28% |
| CE E | DL424 | 10% OFS-6595 | EIFS 1 | 6.02% | 0.26% | 7.61% | 0.03% | 9.94% | 0.20% |
| | | EX and EX with EIFS Formulation 1 (EIFS 1) - Evaluated Phenyl, Vinyl, Octyl Phosphonic Acids (% versus active polymer content) | | | | | | | |
| CE F | Dispersion 1 | None | EIFS 1 | 10.98 | 0.61 | 10.55 | 0.92 | 9.59 | 1.05 |
| EX 1 | EI-2000 | 5% PhPO(OH)$_2$ | EIFS 1 | 4.97 | 0.01 | 4.75 | 0.12 | 4.95 | 0.34 |
| EX 2 | DL424 | 4% PhP(O)(OH)$_2$ | EIFS 1 | 4.33 | 0.09 | 4.59 | 0.05 | 4.87 | 0.10 |
| EX 3 | EI-2000 | 1.5% PhP(O)(OH)$_2$ | EIFS 1 | 4.64 | 0.09 | 4.76 | 0.05 | 4.87 | 0.06 |
| EX 4 | EI-2000 | 0.7% PhP(O)(OH)$_2$ | EIFS 1 | 4.21 | 0.10 | 4.31 | 0.13 | 4.60 | 0.13 |
| EX 5 | EI-2000 | 0.7% PhP(O)(OH)$_2$ | EIFS 1 | 4.15 | 0.21 | 4.14 | 0.15 | 4.38 | 0.10 |
| EX 6 | EI-2000 | 0.5% PhP(O)(OH)$_2$ | EIFS 1 | 4.42 | 0.11 | 4.42 | 0.06 | 4.59 | 0.17 |
| EX 7 | EI-2000 | 0.25% PhP(O)(OH)$_2$ | EIFS 1 | 4.26 | 0.07 | 4.41 | 0.02 | 4.69 | 0.18 |
| EX 8 | EI-2000 | 0.1% PhP(O)(OH)$_2$ | EIFS 1 | 4.81 | 0.13 | 4.76 | 0.09 | 4.88 | 0.16 |
| EX 9 | EI-2000 | 0.5% VinylP(O)(OH)$_2$ | EIFS 1 | 4.23 | 0.11 | 4.21 | 0.16 | 4.37 | 0.07 |
| EX 10 | EI-2000 | 0.89% OctylP(O)(OH)$_2$ | EIFS 1 | 7.78 | 0.80 | 7.39 | 0.69 | 7.11 | 0.40 |
| | | EX and EX with EIFS Formulation 2 (EIFS 2)-Evaluated Phenyl, Vinyl, Octyl Phosphonic Acids (% versus active polymer content) | | | | | | | |
| CE K | DL424 | None | EIFS 2 | 5.29% | 0.40% | 4.93% | 0.45% | 5.15% | 0.44% |
| CE M | DL424 | 5% IE-6683 | EIFS 2 | 5.63% | 0.15% | 5.28% | 0.09% | 4.59% | 0.24% |
| CE N | DL424 | 15% IE-6683 | EIFS 2 | 5.87% | 0.17% | 6.15% | 0.07% | 5.34% | 0.08% |
| EX 11 | DL424 | 5% PhP(O)(OH)$_2$ | EIFS 2 | 4.07% | 0.05% | | | 4.55% | 0.66% |
| CE O | DL424 | 10% PDMS-OH | EIFS 2 | 5.27% | 0.13% | 4.78% | 0.52% | 5.50% | 0.94% |

Water Absorption in Films from EX and CE Coating Formulations

Draw each coating formulation down at a film thickness of 3.175 mm (⅛ inch) and then cured for 14 days at 50% relative humidity (RH) and 22.2° C. (72° F.). Cut each formulation into 3.81 cm×3.81 cm (1.5-inch×1.5-inch) panels and test in triplicate by placing each into 50 grams (g) of deionized (DI) water. Remove each panel at 24, 48 and 168 hours, dry with a towel and weigh. The % water absorption is the % weight increase after immersion in water.

Impact on Water Vapor Permeability

Silicone materials are introduced to organic façade formulations to improve their breathability. Evaluate EIFS Formulation 1 with two silicone co-binders at 25 wt. % versus the active weight of the organic binder (CE Q and CE R, Table 4). Evaluate the coating formulations listed in Table 4 using a modified ASTM E-96 test method. The modification of this test procedure involved the use of ¼ pint paint cans. Remove the lid rim from the can with a can opener. Removal of the lid rim typically leaves an inside can open diameter of 6 cm. Drill a 3.175 mm (6.35 mm diameter hole for desiccant method) diameter hole through the can at the open end and about 6.35 mm below the can rim. The hole allows water or desiccant to be later injected into the can after the test sample is epoxied into the open can end.

Prepare coatings by troweling the coating formulation onto release coated paper at a wet thickness of 3.175 mm. Cure coatings for 14 days at 50% relative humidity (RH) and 22.2° C. Cut the coating out using scissors, or a suitable inside diameter hole saw in the drill press, to a diameter slightly larger than the can opening (i.e., 8 cm). Measure the coating thickness for each before attaching the coating to the can (permanence depends on the thickness of the film). Epoxy the coatings to the open can end to form an assembly using a bead of Miller-Stephenson 907 two-part epoxy adhesive to insure resistance to water at the seal, where the coating is placed with the normal "in-service" side "up," or facing away from the bottom of the can. Allow the assembly to cure for 24 hours at 75° F. and 50%, relative humidity before beginning the test.

Inject 75 ml of water, by syringe, into the assembly through the 3.175 mm diameter hole. After adding the water, seal the hole with a small piece of electrical tape. Weigh the sealed assembly (coating end "up") to four decimal places to get an initial or baseline weight.

Weigh the assembly every 24 hours for 10 days. During the first 48-hour, large fluctuations in weight loss (wet method) or gain (dry method) may be observed. Typically, after 48-hours, weight losses or gains become constant until a steady state weight loss/gain rate is reached. Upon reaching a steady weight loss/gain (seen when a plot of weight loss vs. time becomes a fairly straight line) stop the weighing and record the total time (in hours) over which the weight loss/gain occurred. The difference between the initial weight and the final weight at steady state loss/gain is the weight loss/gain by moisture vapor passage through the test material into the CTR atmosphere.

Water Vapor Transmission (WVT), expressed in grains water vapor/hour/ft$^2$=(weight loss, in grams)×15.43 grains per gram divided by total time for weight loss to occur (in hours) divided by area of can opening (in square feet). Permeance (in English perms), expressed in grains of water vapor/hour/ft$^2$/inch of Hg pressure differential=WVT value divided by 0.437 (for the following test conditions). Water Vapor Transmission Rate (WVTR): the steady water vapor flow rate in unit time through unit area of a body, normal to specific parallel surfaces, under specific conditions of temperature and humidity at each surface. Typical test conditions: assume 100% RH inside the sealed can assembly and 50% RH/75° F. in a controlled temperature room (CTR) atmosphere. Changes from these test conditions would result in changes in the calculations for both the WVT and perm determinations.

No significant impact on water vapor permeability was observed with the addition of the organophosphonic acid.

TABLE 4

| | Organic Binder | Additive | EIFS Formulation | WVTR Ave | grains/ hr · ft² · inHg StDev |
|---|---|---|---|---|---|
| CE P | EI-2000 | None | EIFS 1 | 9.77 | 0.40 |
| CE Q | EI-2000 | 25% Tego-phobe ™ 1650 | EIFS 1 | 8.33 | 0.25 |
| EX 12 | EI-2000 | 5% PhPO(OH)₂ | EIFS 1 | 10.33 | 0.51 |
| CE R | EI-2000 | 25% DOWSIL ™ IE-2404 Emulsion | EIFS 1 | 9.33 | 2.10 |
| CE S | Dispersion 1 | None | EIFS 1 | 9.80 | 1.65 |

Impact on Tint Retention

Tint EIFS Formulation 1 and the specified amount of phenyl phosphonic acid as seen in Table 5 with 1 gm of Colortrend™ Blue 888-7214 dye (www.chromaflo.com/) for each 100 gm of formulation. Trowel the coating formulation onto aluminum panels at a wet thickness of 3.175 mm and allow to cure for 7 days at 50% relative humidity (RH) and 22.2° C. Place the panels in a QUV Weathering Tester (Q-Panel Company) with a QUV UVA-340 lamp (part #LU-8054a from Q-Panel Company). The coatings were subjected to the conditions described in ASTM G154 method (irradiance set point of 0.68 W/m²*nm at 340 nm and cycled 8 hours light at 60° C. followed by 4 hours condensation at 50° C.). Measure the ΔE value at the specified hours of exposure using the Spectro-Guide (model #6801 from BYK-Gardner GmbH) to measure the Hunter CIE L*, a* and b* values. Calculate ΔE* (Total Color Difference) based on delta L*, a*, b* color differences and represents the distance of a line between the sample and standard. CIE L*, a*, b* color values provide a complete numerical descriptor of the color, in a rectangular coordinate system. Delta E (ΔEH)=sqrt ((ΔL)²+(Δa)²+(Δb)²). The addition of this additive does impact the A E value for the coating. As seen in the data of Table 5, the level of the additive is important.

TABLE 5

| Sample ID BLUE | Description Wt. % Phenyl- phosphonic Acid | Organic Binder | Delta E | | | | |
|---|---|---|---|---|---|---|---|
| | | | 1000 hrs | 2000 hrs | 3000 hrs | 4000 hrs | 5000 hrs |
| Control | 0% | EI-2000 | 0.90 | 1.77 | 3.69 | 6.48 | 9.45 |
| EX 13 | 0.7% | EI-2000 | 1.40 | 1.74 | 2.33 | 4.13 | 7.25 |
| EX 14 | 1.5% | EI-2000 | 1.80 | 0.93 | 1.98 | 3.85 | 7.12 |
| EX 15 | 3.0% | EI-2000 | 1.05 | 1.48 | 2.84 | 5.77 | 8.02 |
| EX 16 | 5.0% | EI-2000 | 1.46 | 1.84 | 4.57 | 7.85 | 10.90 |

Evaluations in Lower PVC Coating Formulations

Evaluated a lower PVC coating formulation to determine if the organophosphonic acid additive improves the water resistance of a 43 PVC coating formulation. A formulation described in Table 6 was prepared with the specified additive in Table 7. The formulations were prepared and allowed to sit for one day before the coatings were drawdown at a wet film thickness 30 mils (0.76 mm). These coatings were allowed to cure for 14 days at 50% relative humidity (RH) and 22.2° C. The coatings were cut into 1.5 inch diameter discs. Each coating was tested in triplicate by placing each disc into 50 grams (g) of deionized (DI) water. Each disc was remove at 24, and 168 hours, dry with a towel and weighed. The % water absorption is the % weight increase after immersion in water.

The data for water swell is presented in table 7. This data shows no improvement to the coating formulation compared to the coating with no additive.

TABLE 6

| Raw Materials | Weights (gm) | Description |
|---|---|---|
| Grind | | |
| Water | 152.5 | |
| Tamol ™ 850 | 4.8 | Aqueous Acrylic Dispersant |
| KTPP | 1.4 | Potassium Tetrapolyphosphate (Dispersant) |
| Nopco NXZ | 1.9 | Defoamer |
| Snowhite ® 12 | 422.2 | Calcium Carbonate |
| TiPure ® R-960 | 70.4 | Titanium Dioxide |
| Zoco ® 101 | 46.9 | Zinc Oxide |
| Letdown | | |
| Rhoplex ™ EC-1791 | 470.6 | Acrylic Copolymer Dispersion (55% Solids) |
| Nopco NXZ | 1.9 | Defoamer |
| Texanol Ester Alcohol | 7.0 | Coalescent |
| Skane ™ M-8 | 2.1 | Biocide |
| Ammonia (28%) | 1.0 | Neutralizer |
| Propylene Glycol | 24.4 | |
| Natrosol 250 MXR | 4.2 | Cellulose Ether |

TABLE 6-continued

| Raw Materials | Weights (gm) | Description |
|---|---|---|
| Physical Constants | | |
| % Solids | 66.9% | By Weight |
| | 50.8% | By Volume |

TABLE 6-continued

| Raw Materials | Weights (gm) | Description |
|---|---|---|
| PVC | 43.0 | |
| Density (lb/gal) | 12.1 | |
| Viscosity (KU) | 95 | |
| pH | 8.6 | |

TABLE 7

| Binder | % Additive vs Polymer | 24 hr % H2O | | 7 day % H2O | |
|---|---|---|---|---|---|
| | | Ave | StDev | Ave | StDev |
| EC1791 | 0% | 15.41% | 0.68% | 12.52% | 1.02% |
| EC1791 | 0.63% Phenylphosphonic Acid | 18.27% | 0.70% | 15.23% | 1.68% |
| EC1791 | 0.29% Phenylphosphonic Acid | 20.52% | 1.26% | 17.02% | 1.12% |
| EC1791 | 0.49% Vinylphosphonic Acid | 18.15% | 2.20% | 15.95% | 2.10% |
| EC1791 | 0.86% n-Octylphosphonic Acid | 17.92% | 0.86% | 13.01% | 0.58% |
| EC1791 | 1.0% Phosphoric acid 2-Hydroxyethyl Methacrylate Ester | 16.71% | 2.39% | 13.74% | 1.66% |
| EC1791 | 4.66% Octyltriethoxysilane | 17.22% | 0.45% | 13.36% | 0.52% |

What is claimed is:

1. A coating formulation, comprising:
a pigment;
an organic aqueous emulsion; and
an organophosphonic acid of the formula:

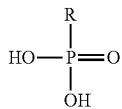

wherein R is an unsaturated alkyl having 2 carbon atoms to provide ethenylphosphonic acid.

2. The coating formulation of claim 1, wherein the pigment is present in an amount to provide the coating formulation with a total PVC content of 75 to 85 percent.

3. The coating formulation of claim 1, wherein the pigment is titanium dioxide.

4. The coating formulation of claim 1, wherein the organic aqueous emulsion is selected from the group consisting of an acrylic aqueous emulsion, a polyurethane dispersion, a polyolefin dispersion and combinations thereof.

5. The coating formulation of claim 1, wherein the coating formulation includes 0.5 to 5 wt. % of the organophosphonic acid based on the total solids weight of the coating formulation.

6. The coating formulation of claim 1, wherein the coating formulation further includes a filler selected from the group consisting of silicon dioxide, sand, aggregate and combinations thereof.

7. The coating formulation of claim 1, wherein the coating formulation further includes an extender selected from the group consisting of clay, calcium carbonate, silicates, alumina silicates, talc, dolomite, silicate minerals and combinations thereof.

8. The coating formulation of claim 1, wherein the coating formulation includes 0.5 to 1.5 wt. % of the organophosphonic acid based on the total solids weight of the coating formulation.

9. The coating formulation of claim 1, wherein the organic aqueous emulsion is an acrylic aqueous emulsion formed with a polymer resin.

10. The coating formulation of claim 9, wherein the polymer resin is formed with a monomer selected from the group consisting of acrylic acid, methacrylic acid, methyl methacrylate, acrylonitrile, ethyl acrylate, butyl acrylate, 2-ethylhexyl acrylate, styrene and combinations thereof.

11. The coating formulation of claim 9, wherein the coating formulation includes 4 to 12 weight percent (wt. %) of the polymer resin from the acrylic aqueous emulsion, wherein the wt. % of the polymer resin is the dry weight of the acrylic aqueous emulsion based on the total solids weight of the coating formulation.

* * * * *